(12) United States Patent
Crosby et al.

(10) Patent No.: US 11,150,891 B2
(45) Date of Patent: *Oct. 19, 2021

(54) METHOD AND DEVICE FOR UPDATING SOFTWARE EXECUTED FROM NON-VOLATILE MEMORY

(71) Applicant: ARM IP LIMITED, Cambridge (GB)

(72) Inventors: James Crosby, Cambridge (GB); Hugo John Martin Vincent, Cambridge (GB); Milosch Meriac, Cambridge (GB); Marcus Chang, Cambridge (GB)

(73) Assignee: ARM IP LIMITED, Cambridge (GB)

( * ) Notice: Subject to any disclaimer, the term of this patent is extended or adjusted under 35 U.S.C. 154(b) by 109 days.

This patent is subject to a terminal disclaimer.

(21) Appl. No.: 16/704,048

(22) Filed: Dec. 5, 2019

(65) Prior Publication Data

US 2020/0110595 A1 Apr. 9, 2020

Related U.S. Application Data

(63) Continuation of application No. 15/409,833, filed on Jan. 19, 2017, now Pat. No. 10,514,903, which is a (Continued)

(30) Foreign Application Priority Data

Jun. 10, 2014 (GB) ...................................... 1410273

(51) Int. Cl.
*G06F 8/658* (2018.01)
*G06F 8/654* (2018.01)
(Continued)

(52) U.S. Cl.
CPC ............ *G06F 8/654* (2018.02); *G06F 3/0607* (2013.01); *G06F 3/0659* (2013.01); (Continued)

(58) Field of Classification Search
None
See application file for complete search history.

(56) References Cited

U.S. PATENT DOCUMENTS 5,761,499 A * 6/1998 Sonderegger ........... G06F 9/445
707/782
6,546,485 B1 4/2003 Tsunedomi et al.
(Continued)

FOREIGN PATENT DOCUMENTS

EP 1 956 482 8/2008

OTHER PUBLICATIONS

Examination Report for GB Application 1410273.5 dated Mar. 29, 2021, 3 pages.
(Continued)

*Primary Examiner* — Philip Wang
*Assistant Examiner* — Rongfa P Wang
(74) *Attorney, Agent, or Firm* — Nixon & Vanderhye P.C.

(57) ABSTRACT

A data processing device has a processor which executes software directly from non-volatile memory. The processor has a runtime component which dynamically maps software element identifiers specified by the software to corresponding software elements in memory. Mapping information is used to determine which software elements identifiers correspond to which software elements. This provides a level of indirection which can be used to make software updates more efficient, by updating only parts of the software while leaving old parts of the software as they are. Updated software elements can be stored to memory and the mapping information updated to point to the new elements, while existing mappings may be retained.

18 Claims, 6 Drawing Sheets

Related U.S. Application Data continuation of application No. 14/735,522, filed on Jun. 10, 2015, now Pat. No. 9,594,551.

(51) Int. Cl.
- *G06F 8/656* (2018.01)
- *G06F 3/06* (2006.01)
- *G06F 8/65* (2018.01)

(52) U.S. Cl.
CPC ............ *G06F 3/0679* (2013.01); *G06F 8/656* (2018.02); *G06F 8/658* (2018.02); *G06F 8/66* (2013.01)

(56) References Cited

U.S. PATENT DOCUMENTS

| | | | |
|---|---|---|---|
| 7,080,371 B1* | 7/2006 | Arnaiz | G06F 8/65 717/168 |
| 7,657,886 B1* | 2/2010 | Chen | G06F 11/1433 717/170 |
| 7,904,901 B1* | 3/2011 | Tormasov | G06F 9/44505 717/178 |
| 8,468,516 B1* | 6/2013 | Chen | G06F 8/656 717/170 |
| 9,348,730 B2* | 5/2016 | Odlivak | G06F 11/3628 |
| 9,594,551 B2 | 3/2017 | Crosby et al. | |
| 2002/0073304 A1* | 6/2002 | Marsh | G06F 8/65 713/1 |
| 2002/0073398 A1* | 6/2002 | Tinker | G06F 8/65 717/110 |
| 2002/0120810 A1* | 8/2002 | Brouwer | G06F 8/66 711/103 |
| 2002/0194578 A1* | 12/2002 | Irie | G06F 8/36 717/122 |
| 2003/0084438 A1* | 5/2003 | Konas | G06F 8/65 717/175 |
| 2003/0101330 A1* | 5/2003 | Duesterwald | G06F 9/30181 712/32 |
| 2004/0107416 A1* | 6/2004 | Buban | G06F 8/656 717/170 |
| 2004/0172640 A1* | 9/2004 | Luo | G06F 9/4492 719/328 |
| 2004/0194079 A1* | 9/2004 | Nguyen | G06F 8/65 717/168 |
| 2004/0261065 A1* | 12/2004 | Abrams | G06F 8/47 717/140 |
| 2005/0257199 A1* | 11/2005 | Johansson | G06F 11/3447 717/126 |
| 2005/0257208 A1* | 11/2005 | Blumfield | G06F 8/65 717/168 |
| 2007/0294683 A1* | 12/2007 | Lee | G06F 9/44521 717/162 |
| 2008/0275973 A1* | 11/2008 | Toeroe | G06F 11/1482 709/223 |
| 2008/0295088 A1* | 11/2008 | Bhat | G06F 8/656 717/170 |
| 2008/0301669 A1* | 12/2008 | Rao | G06F 8/65 717/173 |
| 2009/0113409 A1* | 4/2009 | Zimmer | G06F 16/951 717/168 |
| 2010/0058313 A1* | 3/2010 | Hansmann | G06F 8/658 717/168 |
| 2010/0095293 A1* | 4/2010 | O'Neill | G06F 8/658 717/173 |
| 2010/0205587 A1* | 8/2010 | Dai | G06F 8/656 717/140 |
| 2010/0257517 A1* | 10/2010 | Shram | G06F 8/658 717/168 |
| 2010/0281458 A1* | 11/2010 | Paladino | G06F 8/71 717/106 |
| 2011/0087872 A1* | 4/2011 | Shah | G06F 21/554 713/2 |
| 2011/0107070 A1* | 5/2011 | Barbulescu | G06F 9/3017 712/226 |
| 2012/0030168 A1* | 2/2012 | Weissenberger | G06F 16/178 707/611 |
| 2012/0174124 A1* | 7/2012 | Ward | G06F 8/71 719/331 |
| 2013/0055221 A1* | 2/2013 | Murthy | G06F 11/3608 717/132 |
| 2013/0185564 A1* | 7/2013 | Jaber | G06F 21/572 713/176 |
| 2014/0019950 A1* | 1/2014 | Ohmura | G06F 8/65 717/168 |
| 2014/0189672 A1* | 7/2014 | Raundahl Gregersen | G06F 8/656 717/168 |
| 2014/0195297 A1* | 7/2014 | Abuelsaad | G06Q 10/0635 705/7.28 |
| 2014/0279850 A1* | 9/2014 | Goyal | G06F 16/21 707/609 |
| 2015/0074420 A1* | 3/2015 | Sone | G06F 21/572 713/187 |
| 2015/0193222 A1* | 7/2015 | Pirzadeh | G06F 8/65 717/168 |
| 2015/0261521 A1* | 9/2015 | Choi | H04L 63/12 713/176 |

OTHER PUBLICATIONS

Examination Report for GB Application No. 1410273.5 dated Dec. 9, 2020, 3 pages.
U.S. Appl. No. 15/409,833, filed Jan. 19, 2017; Crosby et al.
Office Action dated Nov. 14, 2018 in U.S. Appl. No. 15/409,833 16 pages.
Office Action dated May 24, 2019 in U.S. Appl. No. 15/409,833 15 pages.
Search Report for GB 1410273.5 dated Jan. 7, 2015, 3 pages.

* cited by examiner

METHOD AND DEVICE FOR UPDATING SOFTWARE EXECUTED FROM NON-VOLATILE MEMORY

This application is a continuation of U.S. application Ser. No. 15/409,833 filed Jan. 19, 2017, which is a continuation of U.S. application Ser. No. 14/735,522 filed Jun. 10, 2015 (now U.S. Pat. No. 9,594,551), which claims priority to GB Patent Application No. 1410273.5 filed Jun. 10, 2014, the entire contents of each of which are incorporated herein by reference in this application.

The present technique relates to the field of data processing. More particularly, the present technique relates to devices which execute software from non-volatile memory.

Non-volatile memory is memory which retains its data when power is removed. This contrasts with volatile memory which loses its state when power to the memory is switched off. For example, non-volatile memory may include flash memory, read only memory (ROM), ferroelectric random access memory (FRAM), magnetoresistive RAM (MRAM), phase change RAM or spin RAM. Conventionally, non-volatile memory is used as a secondary storage for software, with the processor executing the software from a volatile memory such as dynamic random access memory (DRAM) or static random access memory (SRAM). Hence, in most devices software is not executed directly from the non-volatile memory.

However, with the increasing demand for low power electronic devices, devices are now being designed to execute code directly from non-volatile memory. Non-volatile memory typically consumes less energy than volatile memory and so power can be saved by using the non-volatile memory as primary storage for software as the software is being executed. For example, embedded systems with relatively small processing capability, or devices or sensors in the cloud or Internet of Things may execute software directly from non-volatile memory to save energy. The present technique seeks to provide an improved method of updating software executed from non-volatile memory in a processing device.

Viewed from one aspect the present technique provides a method of updating software in a device comprising a non-volatile memory and a processor configured to execute software from the non-volatile memory, the software comprising a plurality of software elements for processing by the processor;

wherein the processor is configured to execute a runtime component for mapping software element identifiers specified by the software to corresponding software elements to be processed by the processor, the runtime component having mapping information for determining the corresponding software elements for the software element identifiers;

the method comprising steps of:

obtaining at least one updated software element to be included in the software;

storing said at least one updated software element to the non-volatile memory or a further memory; and updating the mapping information to identify an updated mapping between said at least one updated software element and a corresponding software element identifier.

The processor of the device is provided with a runtime component which at runtime maps software elements identified by software element identifiers to corresponding software elements to be processed by the processor. For example, the software elements may include functions called by the software, blocks of code to be executed, objects, classes or methods in a system using an object orientated programming language, and so on. In general, the software elements may be anything which can be referred to by the software code. Hence, the runtime component allows for indirection between the software elements called by the software and the corresponding software elements which are actually processed by the processor. The runtime component can be exploited to make software updates more efficient, which has typically been a problem for devices which execute code directly from non-volatile memory. When software is to be updated, the updated software elements are stored to the non-volatile memory or to a further memory, and the mapping information can be updated to identify an updated mapping between the updated software element and the corresponding software element identifier. Hence, the runtime component can patch together updated code with old code by remapping software element identifiers referred to in code to new or old software elements in memory as appropriate.

While it is possible to use this method to replace entire pieces of software with updated software, it is particularly useful for partially updating software without replacing the entire software. In current systems which execute software from non-volatile memory, updates to the software are typically expensive because typically the update is done by replacing the entire software with new software. If the non-volatile memory is not rewritable, this uses up a significant portion of the limited amount of remaining memory available, while even if the non-volatile memory is rewritable, writes to the non-volatile memory are more expensive than writes to volatile memory in terms of power consumption and access latency.

In contrast, with the present technique the mapping information for a piece of software can be updated while retaining at least one existing mapping between an existing software element in the non-volatile memory and a corresponding software element identifier. Hence, it is not necessary to replace the entire software during the update, and most of the existing mappings between software elements and software element identifiers can be retained. By enabling partial updates of the software, the present technique enables the software to be updated while the device continues running the software. For example, there may be no need to reboot the device in order to install the update, as is usually required for firmware updates, because the device can continue executing the software elements which are not being changed while other software elements are being installed. This approach also helps to reduce the hardware scale of the device since less additional memory capacity needs to be provided to accommodate potential software updates.

Different types of updates may be implemented using this technique. In some cases, at least one new software element may be added to the software. The new software element may be stored to the non-volatile memory or a further memory and the mapping information may be updated to identify the mapping between the new software element and a corresponding software element identifier (which may be a software element identifier not previously mapped using the mapping information). This allows new functionality to be added to the software.

The updated software element may in some cases be a replacement software element for replacing at least one existing software element of the software. In this case, the mapping information may be updated so that the previous identifier used to refer to the existing software element now maps to the replacement software element instead. Hence, code using the updated software element may not need to change, as its references to the old software element will now be remapped by the runtime component to use the replacement software element.

Also, software elements can be updated by adding "wrapping" software elements which are to be processed before or after at least one existing software element of the software. For example, if the software element is a method or function, the wrapping software element may implement a pre- or post-processing operation to be carried out before or after the existing method/function. For example, the wrapping software element may provide functionality for verifying input operands or result operands for the method/function. The mapping information may be updated so that the identifier of the existing software element now maps to the combination of the existing software element with one or more wrapping software elements. This approach may be particularly useful if the "wrapped" original software element is relatively large and so replacing the software element with a new software element may use up more of the spare memory capacity than adding wrapping elements to be processed before or after the original software element.

In general, the software element identifiers may be any parameter used to refer to software elements in the code to be executed by the system. For example, the software element identifiers may comprise a name, string, number, code, or other identifier of the software element. The runtime environment provides abstraction by dynamically mapping the identifier to an indication of a particular software element in memory (e.g. another name, string, code, etc. or a memory address).

In some examples, the runtime component may be provided as a feature of a programming environment which uses dynamic remapping, resolution or linkage of software. For example, the language Objective-C or variants of Objective-C may be used. Objective-C is a language where the runtime can dynamically select which software elements to process in response to "messages" from the code executed. The messages may include the software element identifier for example. Objective-C is generally used for systems which execute software from volatile memory, but in such systems the runtime component of this language is not used for updating software, because with volatile memory there is little overhead associated with replacing entire software programs because the software would in any case have to be restored following power off. The inventors of the present technique recognised that Objective-C or similar programming languages having a runtime component could be used in systems executing software from non-volatile memory to make software updates more efficient.

The at least one updated software element may be obtained in an update file, which may for example include information defining the updated software element and further information such as metadata about the updated software element and other information defining how to perform the update.

The software element specified by the update file may need to be transformed to generate the updated software element to be installed. For example, the software code may have been written in a position-dependent manner and so addresses specified in the update file may need to be relocated to point to the memory locations storing other software elements or resources referred to in the software. Therefore, the transformation may include relocating addresses referenced by the at least one software element. The processor or the runtime component may have relocation information specifying where different software elements have been placed in memory, and this can be used to decide how to transform the software element for example. On the other hand, if the code is written in a position-independent manner (e.g. using relative addressing) then the address relocation may not be needed.

The method may include verifying the integrity of the at least one updated software element defined in the updated file. For example, to maintain security the device may need to check whether the update file has come from an authorised source. For example the verification may include verifying whether a signature included in the update file corresponds to one or more hash values determined using at least part of the update file. This means that, in order to control a software update at the device, the party providing the update has to cryptographically sign the update using a key that the device already knows and trusts or a key that the device can derive the trust of from another party that it trusts.

Having verified the integrity of the software element, the updated software element can be stored to memory and the mapping information can be updated. However, in some cases there may be some time which passes between verifying the signature and then actually installing the software, for example if some processing of the update file is required first, such as the transformation or address relocation described above. In some systems there could be a concern that a malicious party could tamper with the update process so that after the signature of the update file has been verified, another update software element which did not come from the verified update file is injected and this is stored to memory. To prevent this, a further verification may be performed for verifying the integrity of the at least one update software element when actually storing the updated software element to the memory. The further verification may take place in parallel with writing the updated software element to memory, or after the write has already taken place. For example, the further verification may include reversing the transformation applied to the software element to restore the software element identified by the update file and then verifying the integrity of the restored software element by checking the signature again. This further verification may be done before, or in parallel with, the write to memory and if the verification fails then an error can be triggered and the update can be suspended.

The updated software elements may divided into portions and the write to memory and further verification may be performed incrementally a portion at a time. For example, as each portion is written to memory, the portion can be streamed back to reverse the transformation applied to the portion and then the signature can be checked for that portion to see whether it is valid. For example, the hash algorithm may be an incremental algorithm which is determined portion-by-portion based on the hash of previous portions and the new portion being processed, to allow the signature to be checked piece by piece.

The update file may also include a handler (or "helper" code) for updating at least one piece of state information of the processor. As well as updating software elements, some data or data formats may also need to be changed to ensure compatibility with the new code. For example, the state data may be file system information or database format information (e.g.

field types, names, sizes, table names, etc. within the database). The handler can be executed alongside or after the software update to prepare the state data ready for execution of the new code.

In some cases, the updated software element(s) may be the same as existing software element(s) in the non-volatile memory, and may be stored to the further memory. That is, rather than adding or replacing functionality of the software, the software update may instead improve efficiency of execution of the software by relocating it to a different memory. For example, the device may have multiple memories including the non-volatile memory, and the runtime component may copy or move selected software elements from one memory to another and update the mapping information to reflect this relocation. Some memories may have a higher energy cost than others, so the runtime component may periodically review usage of software elements and relocate elements to improve energy efficiency. For example, the runtime component may maintain usage information indicative of previous usage or current usage of the software elements, and may select which elements to relocate to the further memory based on the usage information. For example, the runtime may move or copy frequently used software elements to a faster-access memory and less frequently used software elements to a memory for which the fixed cost of storing the data while not being accessed is lower. Hence, the level of indirection provided by the runtime component also enables performance/energy trade-off to be implemented dynamically within the electronic device. This can be transparent to the software being executed which simply refers to software elements without considering which memory stores the software.

The usage information may be determined by the runtime component as part of the mapping it does, by tracking or counting references to software element identifiers in the code.

The runtime may randomly or systematically count only a subset of all function calls or mappings made through the runtime, since this tracking may be expensive and so the runtime may only do the tracking for a percentage of the mappings or a percentage of the time (e.g. 1%) and assume that this is representative.

The selection of which elements to relocate may be based on characteristics of the memory the code is currently in. For example, the runtime may be more likely to move code in a high-power memory or a slower memory than code in a faster memory or lower-power memory.

For example, the runtime may move all currently executing code or code which is scheduled to be executed into a smaller or lower power memory so that the memory it was originally stored in may be powered down to reduce overall energy use. That is, the selection of the existing software elements may be based on which processes or tasks are currently being executed. For example, a device may spend 90% of its on-time checking whether it needs to do something, then only occasionally call a much larger body of code to actually do this. The runtime could detect this and move the software elements needed for the "checking" process into the low-power memory so that a larger memory including the rest of the code can be powered down.

Over time, several updates for the software may be performed so that eventually the software elements belonging to the software are fragmented across the non-volatile memory or the further memory. Some old software elements which were replaced by updated software elements may still be present. Eventually, the device may start to run out of memory capacity, so to free up extra space, the system may defragment previously installed software elements in the non-volatile memory or the further memory to consolidate them into a smaller space.

As mentioned above, the updated software element may stored in either the non-volatile memory or an optional further memory. The further memory is optional and not all devices which implement the present technique may have a further memory. However, providing a further memory for storing the updates can be useful to make the non-volatile memory more efficient. For example, the original non-volatile memory may be a read only memory (ROM) which can efficiently store a large amount of original code. The rewritable further memory then only needs to store the updates to the original code, so can be relatively small. In this case, the defragmenting discussed above may be applied only to the further memory and not the original memory. The further memory may be a volatile memory (e.g. DRAM or SRAM) or may be another non-volatile memory (e.g. flash).

The non-volatile memory may be of a range of types. For example, the non-volatile memory may comprise one or more of ROM, NAND flash, NOR flash, magnetoresistive random access memory, ferromagnetic RAM, or spin RAM. Other types of non-volatile memory may be developed in future which could also be used.

The processor executes software directly from non-volatile memory in the sense that the non-volatile memory is the primary store of software which acts as the main memory for the processor. Nevertheless, the processor may still have a cache for caching some of the software from the non-volatile memory and this cache may be formed of volatile memory. This is different to conventional systems such as mobile phones in which a volatile memory is provided as main memory in addition to the cache, and any non-volatile memory is only used as a backup store for the main volatile memory when the power to the device is removed.

The present technique may be implemented using at least one computer program stored on a computer readable storage medium which controls the data processing device to perform the method described above. For example, the storage medium may be a non-transitory medium.

Viewed from another aspect, the present technique provides a data processing device comprising:

a non-volatile memory configured to store software; and a processor configured to execute the software from the non-volatile memory, the software comprising a plurality of software elements for processing by the processor;

wherein the processor is configured to execute a runtime component for mapping software element identifiers specified by the software to corresponding software elements to be processed by the processor, the runtime component having mapping information for determining the corresponding software elements for the software element identifiers; and the processor is configured to update the software by obtaining at least one updated software element to be included in the software, storing said at least one updated software element to the non-volatile memory or a further memory, and updating the mapping information to identify an updated mapping between said at least one updated software element and a corresponding software element identifier.

Viewed from a further aspect the present technique provides a data processing device comprising:

non-volatile memory means for storing software; and processing means for executing the software from the non-volatile memory means, the software comprising a plurality of software elements for processing by the processing means;

wherein the processing means is configured to execute a runtime component for mapping software element identifiers specified by the software to corresponding software elements to be processed by the processing means, the runtime component having mapping information for determining the corresponding software elements for the software element identifiers; and the processing means is configured to update the software by obtaining at least one updated software element to be included in the software, storing said at least one updated software element to the non-volatile memory means or a further memory means for storing data, and updating the mapping information to identify an updated mapping between said at least one updated software element and a corresponding software element identifier.

Further aspects and features of the present technique will be apparent from the following description of example embodiments, which is to be read in conjunction with the accompanying drawings, in which:

FIG. 1 schematically illustrates an example of a data processing device;

Figure 1:
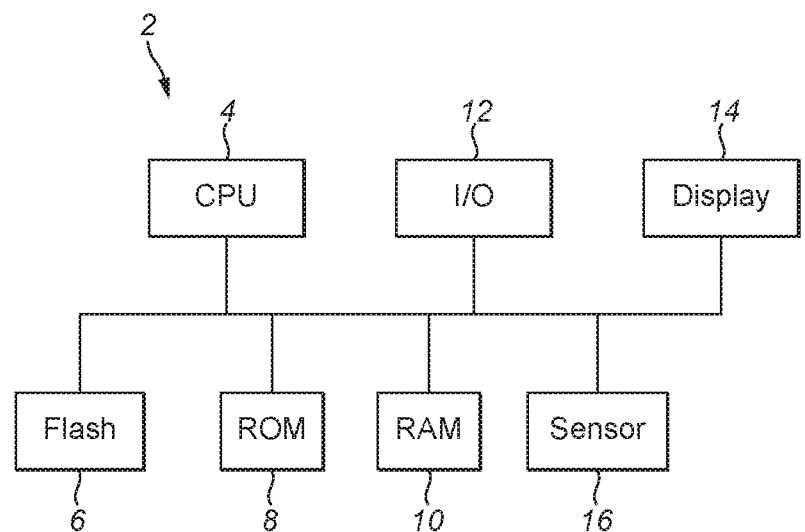

FIG. 1 illustrates an example of a data processing device 2 having a processor 4, memory devices 6, 8, 10, an input/output (I/O) unit 12, a display 14 and a sensor 16, such as a temperature sensor or other device for sensing external conditions. It will be appreciated the device may have other components not shown. The memory devices include non-volatile memory, such as flash memory 6 or a ROM 8, and volatile memory such as RAM 10. The processor 4 can execute software directly from the non-volatile memory, 6, 8, although some software may be cached in a cache local to the processor 4. The non-volatile memory 6, 8 is more power efficient than volatile memory and retains its state when no power is provided to the device 2. The RAM 10 may be used as an additional memory for executing frequently executed code more efficiently. Nevertheless, the read only memory 8 or flash 6 is a primary storage for software. For example, the device 2 may be an embedded system such as a sensor or other cloud-connected device in the Internet of Things, a control device such as a micro controller 4 in an appliance such as a washing machine or fridge, or other small embedded devices such as watches, health care monitors, etc.

Figure 2:
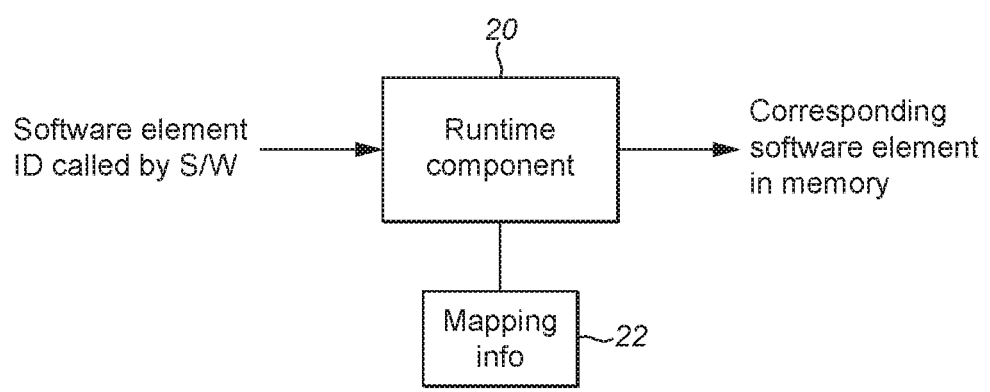
FIG. 2 illustrates a runtime component for mapping software element identifiers called by software to corresponding software elements in memory.

The processor 4 executes a runtime component 20 as shown in FIG. 2 which maps software element identifiers called by software to corresponding software elements actually stored in the memory 6, 8, 10. For example, the runtime component 20 may be provided as part of the programming environment associated with the language Objective-C, or another language providing such dynamic remapping of software calls. Mapping information 22 is provided for the runtime component 20 to determine how to map the software element identifiers to corresponding software elements. For example, the mapping information may be stored as a hash table, hash tree, red-black tree, or binary tree used to map the software element identifiers to the corresponding software elements. The software elements may include any element that can be referenced by software, such as functions called by the software, instructions or groups of instructions executed, or objects, classes, methods or categories in code written using object oriented programming. The software element identifier may be a name of the software element, or other type of identifier such as a string or code referencing the element or an address pointer. The software element identifier may in some cases also include information about arguments being passed to the software element such as function arguments and information defining the argument types. Also, in some cases the software element identifier may be a hash of the actual identifier used by the software itself to refer to the software elements. For example, when an element is first referenced by code then the runtime component 20 may hash the element identifier and then look up the mapping information 22 based on the hash, but on subsequent references to this element the hash may directly be used as the software element identifier rather than its actual name or other identifier provided by the code.

In general, the runtime component 20 has the capability to dynamically remap software element identifiers to the corresponding software elements in different ways (the mapping by the runtime component 20 is not merely a static mapping). The runtime component 20 is free to remap elements called by code to different software elements in memory 6, 8, 10 depending on performance or energy considerations. This level of indirection between the elements specified by the code and the elements actually processed by the processor 4 is useful for making updates to software more efficient. Updates can be performed by loading one or more updated software elements into memory 6, 8, 10 and updating the mapping information 22 to reflect a new mapping between a new or existing software element identifier and the updated software element(s) stored to memory, rather than needing to update the entire program. On subsequent execution of the software the runtime component 20 will then dynamically remap references to the software element identifiers to the updated parts of memory as appropriate.

Figure 3:
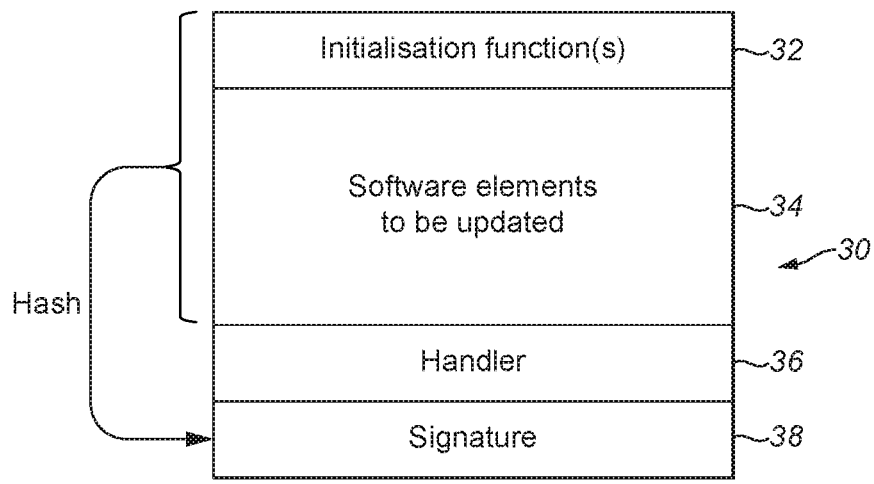
FIG. 3 illustrates an example of an update file for updating software in the device.

FIG. 3 shows an example of an update file 30 which may be obtained or downloaded by the processor 4 when software is to be updated. The update file includes one or more initialisation functions 32 which provide metadata about the rest of the contents of the update file 30 and may include some control programs for performing the update if these are not already provided by the processor 4. The update file 30 also includes one or more software elements 34 to be updated, such as new or replacement classes, methods or functions for example. The update file 30 also includes a handler program 36 for updating state information within the processor 4 or memory 6, 10. For example, it may be required to update state data such as formats of fields in a database or file system information for consistency with the updated software elements. The handler code can be run before, in parallel or after updating the software to make the corresponding update to the system state. The update file 30 also includes a signature 38 for verifying the identity of the update file. For example, the signature 38 may correspond to a hash of the remainder of the update file 30 or a hash of a subset of the update file, and the processor 4 may verify the integrity of the update file by regenerating the hash using the required portions of the update file 30 and determining whether the signature 28 matches the hash determined. The update can be suspended or halted if the hash does not match. The update file 30 may in some cases be referred to as an 'image' to be installed.

The software being updated may be any software being executed from non-volatile memory 6, 8 by the processor 4, but in some cases may be firmware software which defines the core behaviour of the device 2, rather than application software running on top of the firmware software. Since only parts of the firmware may need to be replaced, the update can be performed while the device 2 remains booted and continues to execute the parts of the firmware which remain the same. Therefore, it is not necessary to reboot the device to install the firmware.

Figure 4:
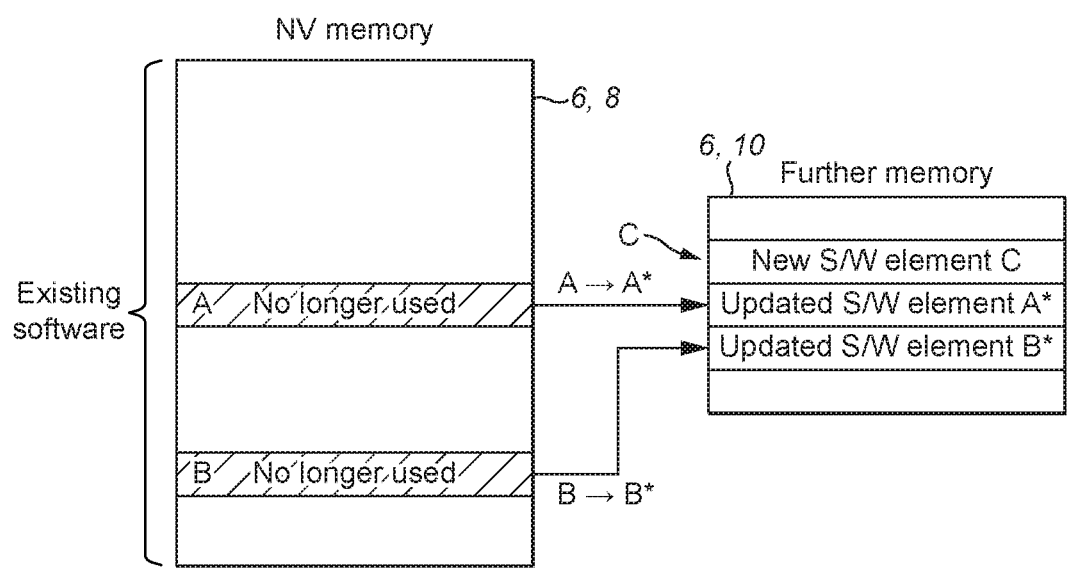
FIG. 4 illustrates an example of performing a partial update of software by remapping software element identifiers to updated software elements.

FIG. 4 shows an example of installing new software by updating only part of the existing software. As shown in the left part of FIG. 4, the existing software is stored within non-volatile memory 6, 8. Non-volatile memory is preferably used for the existing software because it is more power efficient than RAM 10 for example. However, some components A, B of the existing software then need to be replaced with updated components A*, B* and a new software element C also needs to be added. Hence, an update file 30 as shown in FIG. 3 is provided with the updated elements A*, B*, C and these elements are stored to a further memory 6, 10. The mapping information 22 of the runtime component 20 is updated to remap the software element identifiers for elements A, B so that they now point to the updated elements A*, B* in the further memory 6, 10. Similarly, a new mapping is added to the mapping information 22 to map an identifier of element C to the new software element stored in the memory 6, 10. In this way, the existing software can be patched with some new or updated elements without having to rewrite the entire software. This makes the update process more efficient in terms of time and energy, and also reduces the amount of additional memory required for accommodating the update. FIG. 4 shows an example where the updated elements are written to the further memory, but if the non-volatile memory 6, 8 originally storing the software is rewritable, then the updated elements could also be stored to the same memory 6, 8. However, as it is expected that the updated elements will need much less memory capacity than the existing software, it can be more energy efficient to provide a ROM 8 as the original non-volatile memory and then only provide a small amount of rewritable non-volatile memory (e.g. flash) or volatile RAM 6, 10 as the further memory for the updates.

Figure 5:
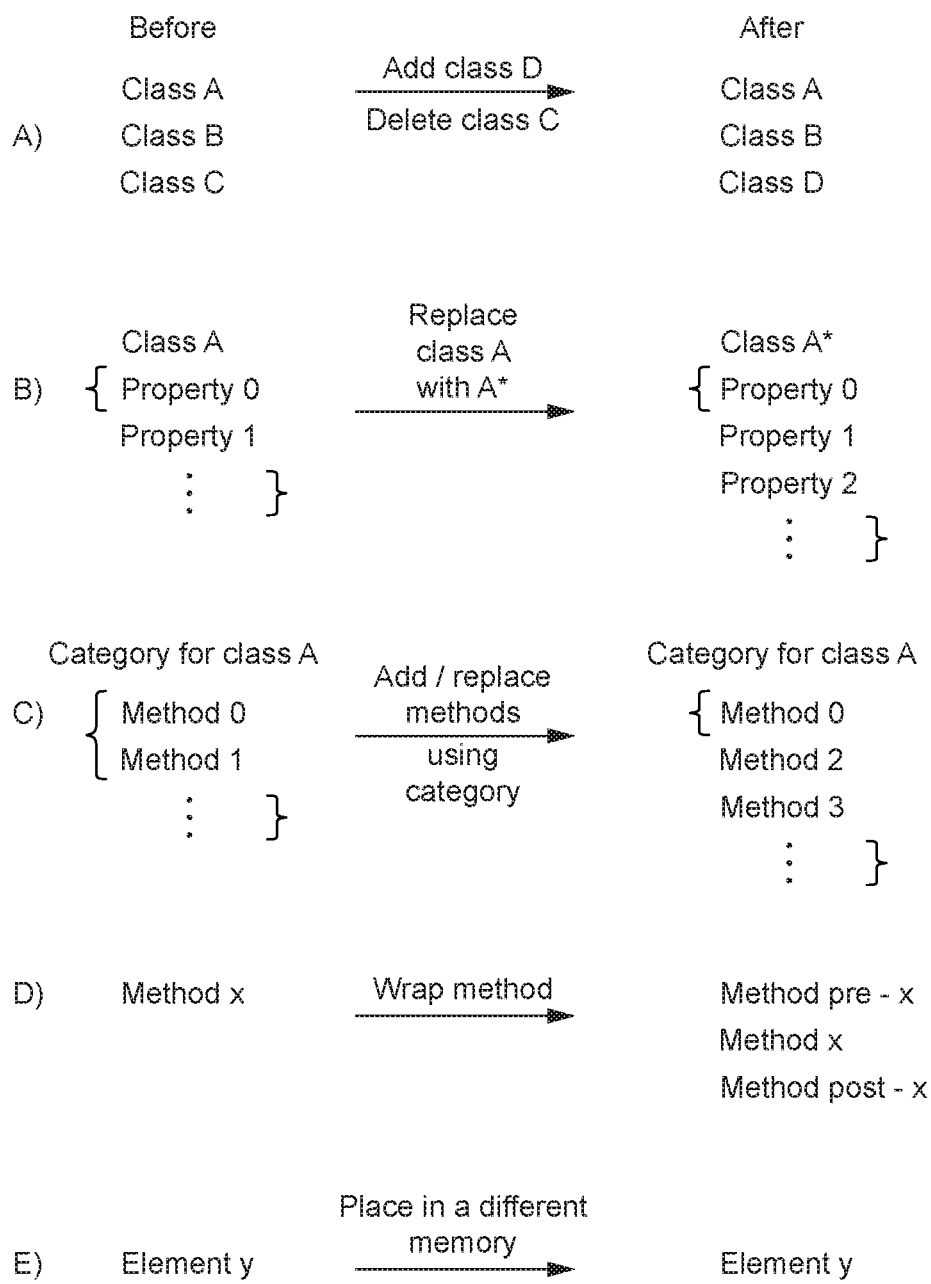
FIG. 5 shows some examples of different types of updates.

FIG. 5 shows five examples A to E of updates that can be performed:
A) Classes can be added or deleted. The mapping information can be updated to add or delete mappings for the new or deleted classes.
B) A class can be replaced with a replacement class with different properties or additional properties. The mapping information 22 is updated so that the identifier of the old class A is remapped to the replacement class A*.
C) Methods (or functions) can be added or replaced. For example, some programming allow categories of methods to be defined for a particular class. Therefore, to add a new method or replace a method for class A an updated category of methods can be supplied and the mapping information for that category updated to point to the new location of the replacement category.
D) An existing method or function can be wrapped with pre- or post-processing functionality. For example, the update may add a preliminary function for verifying input values to a method, or a post-processing function for verifying the result of a method. Hence, the software elements corresponding to the wrapping functionality can be stored to memory and then the mapping information for the method may be updated so that references to the method now trigger the processor to perform the method in combination with the wrapping functions.
E) The updated software element can be the same as an existing software element. The update to the software may not necessarily add any functionality but may simply be placing an existing software element in a different memory for performance or energy saving reasons (e.g. see FIG. 7 below). Hence, the mapping information 22 can be updated to reflect the new location of the software element.

Figure 6:
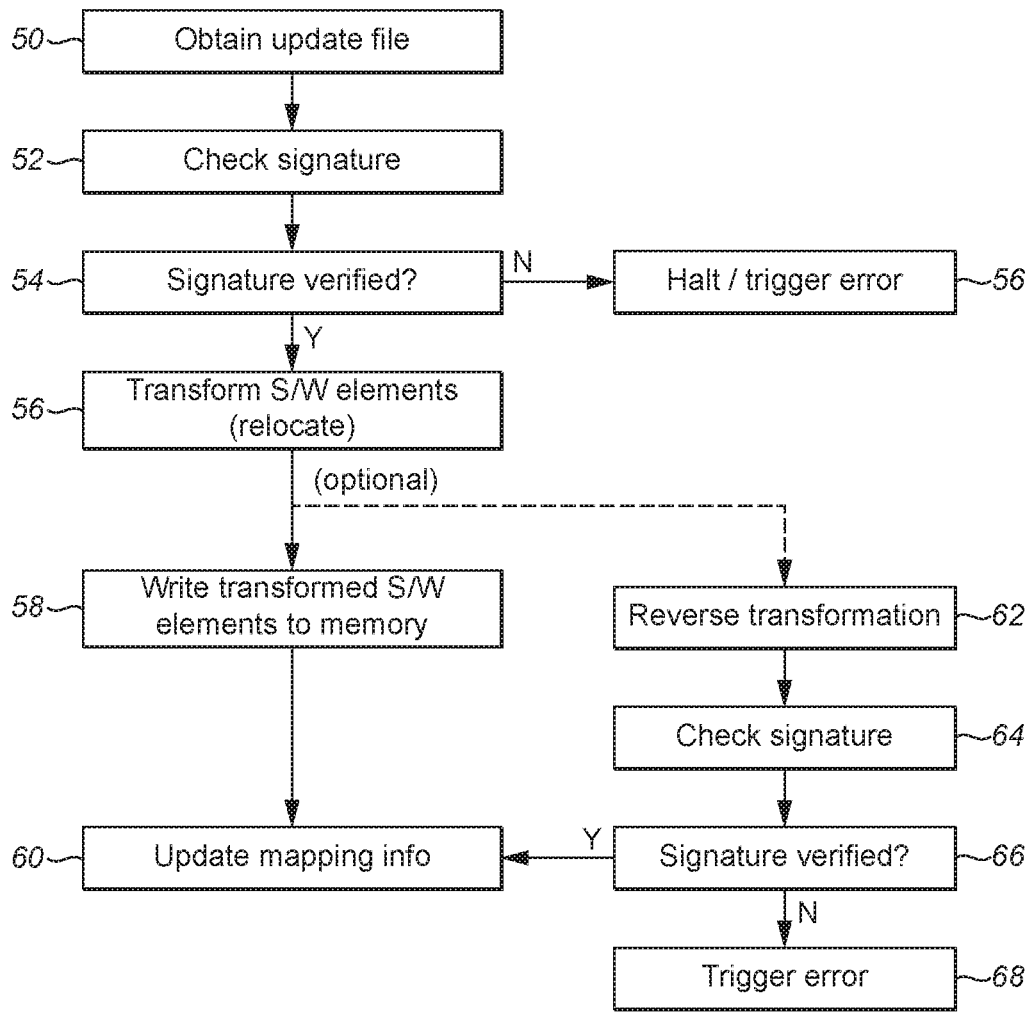
FIG. 6 shows a method of updating software executed from non-volatile memory.

FIG. 6 shows a method of updating software executed from non-volatile memory. At step 50 an update file 30 is obtained, for example by downloading the update file over a network or installing the update file from a recording medium. At step 52 the signature 38 of the update file 30 is checked by generating a hash of at least part of the update file and checking whether the hash is the same as the signature 38. As step 54 it is checked whether the signature has been verified and if not then at step 56 the update is halted or an error is triggered. If the signature is verified then at step 56 a transformation is applied to the software elements 34 included in the update file. For example, addresses referred to by the software may be relocated to reflect the locations of other elements referred to in the code. At step 58 the transformed software elements are written to one of the memories 6, 8, 10. At step 60 the mapping information 22 is updated to reflect the update to the software. When the software is executed, references to software element identifiers are then mapped by the runtime component 20 to the updated elements in memory.

Figure 8:
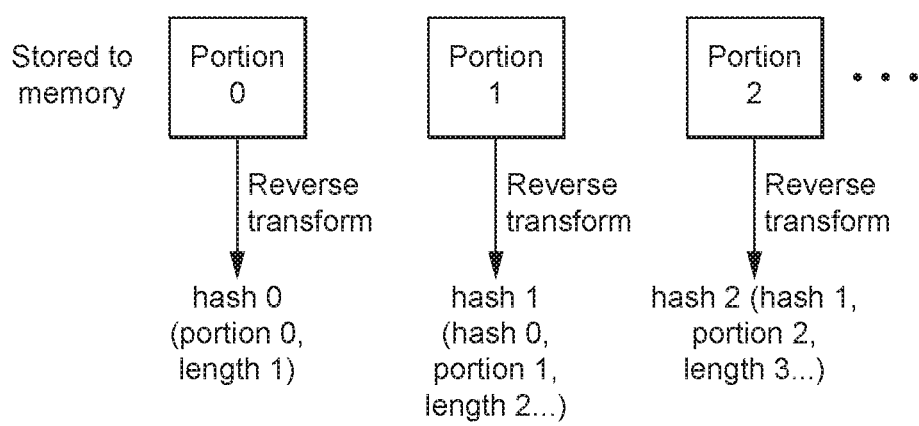
FIG. 8 illustrates an example of incrementally verifying the integrity of an update as portions of software are written to memory.

It is possible that after verifying the signature at step 54 there may be some time before the elements are written to memory 58, for example if some processing is required for the transformation at step 56. Therefore, it may be desired to repeat the verification when actually writing the elements to memory. Therefore, optionally as the elements are written to memory at step 58 (or after the elements have already been written to memory), a reverse transformation may be applied at step 62 to restore the original software element defined in the update file. Where the transformation is an address relocation, then relocation information may have been stored during the original relocation operation indicating the changes to the addresses that were made, and this relocation information can be used to undo the relocation. The signature 38 is then checked against the hash of the elements at step 64. As shown in FIG. 8, the further verification may be performed incrementally as portions of the software elements are written to memory. For example for each portion to be written to memory, the reverse transformation may be applied to that portion and then a hash value may be calculated using that portion, and any previous hash derived from other portions. For the first portion, the hash may be based solely on that portion but for subsequent portions the hash may be based on the currently written portion together with the hash derived from the previous portions so that the verification proceeds incrementally for each portions. The hash may also consider factors such as the number of portions that have already been checked (the length of the stream already hashed). In this way, each portion can be checked against the signature 38 which may similarly correspond to an incremental hash in this way. At step 66 it is determined whether the signature is verified, and if not, then at step 68 an error is triggered. If the signature is correct then the write proceeds as normal and the mapping information is again updated at step 60. The further verification when writing the software elements to memory can guard against the risk of a malicious party injecting additional elements into the system to be written to memory after the signature of the actual update file 30 has already been verified. If performing the further verification of steps 62-68 after the elements have already been written to memory, then while this would not prevent the update from being carried out, the error triggered at step 68 may still be useful to react to a device that has already been compromised so that appropriate action can be taken.

While FIG. 6 shows the mapping information being updated at step 60 at the end of update process, it is also possible to update the mapping information at a different time (e.g. as the updated elements are being written to memory, or after the update has been performed). For example, the mapping information may be updated by running initialiser functions that are part of the updated software itself. Alternatively, if moving software elements to a different memory as discussed with respect to FIG. 7 below, a separate mechanism provided by the runtime component 20 separately from the update process may be used to update the mapping information.

Figure 7:
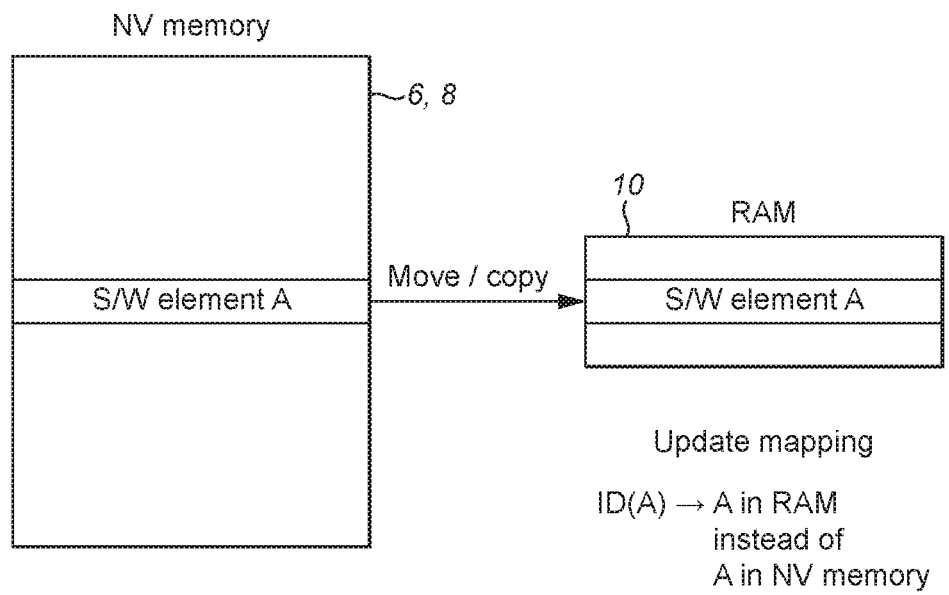
FIG. 7 illustrates an example of moving or copying a software element to a different memory.

FIG. 7 shows an example where the updated element is the same as an existing element as shown in part B of FIG. 5. For example, for performance reasons a frequently used element from the ROM 8 or flash 6 may be moved or copied to RAM 10 where it can be accessed more quickly to improve performance. Alternatively, if only a subset of software elements in a larger memory are being used, then these can be copied to a smaller memory so that the rest of the larger memory can be powered down to save energy. The runtime component 20 may maintain usage information representing the current or previous usage of software elements or processes or tasks comprising the software elements, and use this to periodically or continuously review the locations at which software elements are stored. When doing so, the mapping information 22 may also be updated to reflect the location of the software elements. Hence, it is not necessary for the update to be triggered by an update file 30 as shown in FIG. 3, and the updated software elements may be a selection of existing elements from the non-volatile memory 6, 8.

Figure 9:
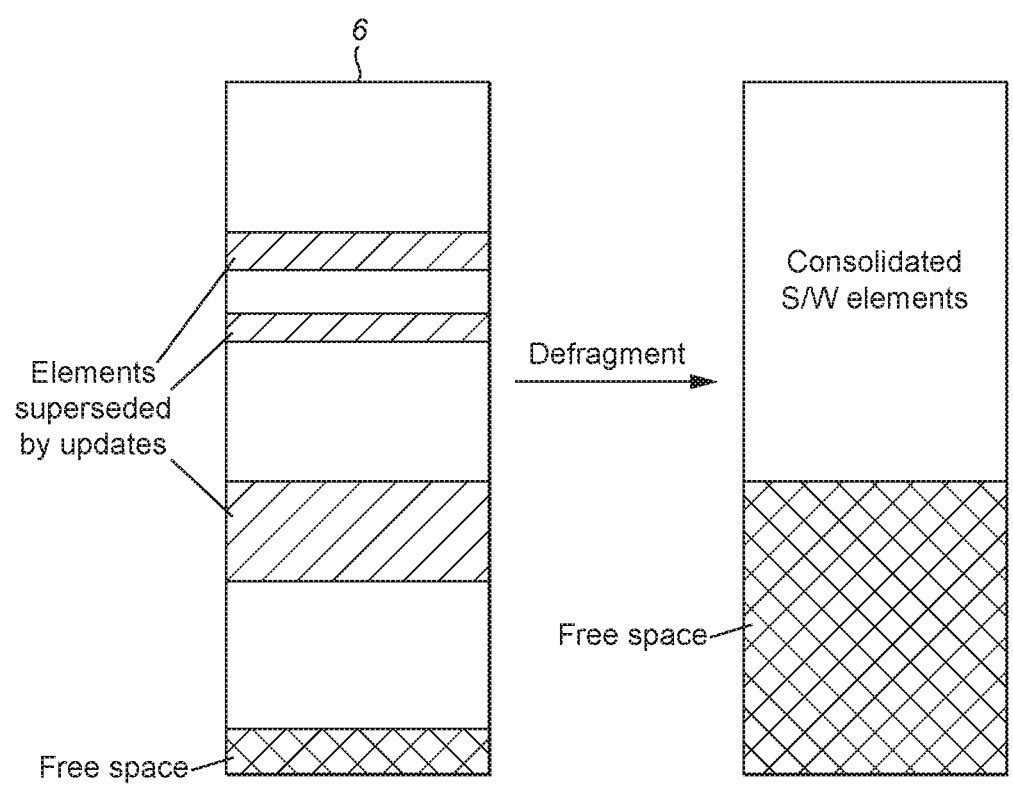
FIG. 9 illustrates an example of defragmenting previous updates to produce consolidated software elements.

FIG. 9 shows an example of defragmenting software which has arisen from a number of previous updates. As shown in the left hand part of FIG. 9, as successive updates are installed then some software elements may be superseded by updated elements and so eventually the non-volatile memory, for example the flash 6, may include a number of discrete chunks of software elements with other areas of the memory still storing the deprecated elements. Eventually, there may not be enough free space in the memory 6 to perform further updates. Therefore, a defragmenting operation can be performed to consolidate the software elements which are still needed into a smaller space, freeing up more space for further software elements. This can be done periodically, or can be triggered when the amount of free space drops below a given threshold. When performing the defragmentation, the runtime component 20 updates its mapping information to reflect the new positions for the software elements.

Sometimes, when a series of update files need to be applied to a given piece of software, it may be important that the update files are applied in the correct order. For example, with a series of update files ABCD update file B might not be allowed to be applied before update A, as the resulting software may be different depending on the order of the updates (e.g. update B may reverse some of the changes that were made by A, or map the same software element identifiers to different software elements). To ensure that the updates are installed in the correct order, an indication of the most recent update (or an indication of a chain of previous updates) may be stored by the device 2, and the update file 30 may include metadata defining one or more previous updates which are prerequisites for installing the update file 30. The verification of the update file may include checking whether the most recent update stored by the device 2 matches one of the prerequisites indicated in the update file. In some cases it may be possible to provide several alternative updates which can each be installed over the same version of the software, or to allow a single update file to be installed over any of several different versions of the software. For example, to speed up installation it may be possible to combine a number of different updates BCDEF into a single update file F', so that it is allowable to install both update B and update F' over a previous version of the software A, or to install a later update G over both versions F and F'.

The invention claimed is:

1. A method of updating software on a device, the device having mapping information comprising a mapping between software elements of the software in storage and corresponding software element identifiers referred to in code, the method comprising:
   obtaining at least one updated software element;
   storing the at least one updated software element;
   updating the mapping information to include a mapping between the updated software element and a corresponding software element identifier,
   wherein the updated software element comprises a new or a deleted class and updating the mapping information for the updated software element to be included in the software comprises:
   adding or deleting mappings for the new or deleted classes.

2. The method of claim 1, further comprising:
   wrapping a method or function with pre- or post-processing functionality.

3. The method of claim 2, comprising:
   updating the mapping information for the method or function such that references to the method or function trigger a processor to perform the method or function in combination with the pre- or post-processing functionality.

4. The method of claim 1, wherein the updated software element comprises a function to verify input values to a method or verify a result of a method.

5. The method of claim 1, further comprising:
   placing an existing software element from a current memory location to a new memory location;
   updating the mapping information for the existing software element to point to the new memory location.

6. The method of claim 1 wherein updating the mapping information comprises remapping a software element identifier for an existing software element in storage to the updated software element.

7. The method of claim 1 wherein updating the mapping information comprises including a new mapping between the updated software element and the corresponding software element identifier.

8. The method of claim 1, wherein the storage is non-volatile memory the method further comprising:
   executing the software from the non-volatile memory.

9. The method of claim 1, comprising updating the mapping information to include a mapping between the updated software element and a corresponding software element identifier when the device remains booted during the update.

10. The method of claim 1, wherein a runtime component is configured to update the mapping between the updated software element and the corresponding software element identifier.

11. The method according to claim 1, wherein the obtaining the at least one updated software element comprises obtaining an update file comprising the updated software element.

12. The method according to claim 11, wherein the update file comprises a signature to verify the identity of the update file, wherein the signature corresponds to a hash of a portion of the updated file.

13. The method according to claim 1, comprising:
performing a verification to verify the integrity of the updated software element when storing the updated software element, or after storing the updated software element.

14. The method of claim 1, wherein the mapping information comprises a hash table, hash tree, red-black tree or binary tree to map the updated software element to the corresponding software element identifier.

15. The method of claim 1, wherein the software element comprises one of: an instruction, a group of instructions, an object, a class, a method in code, and a category in code, and wherein the software element identifier comprises one of: a name, a string referencing the software element, code referencing the software element and an address pointer.

16. A non-transitory, computer, computer-readable readable storage medium storing at least one computer program configured to control a data processing device to perform the method of claim 1.

17. A method of updating software on a device, the device having mapping information comprising a mapping between software elements of the software in storage and corresponding software element identifiers referred to in code, the method comprising:
obtaining at least one updated software element;
storing the at least one updated software element;
updating the mapping information to include a mapping between the updated software element and a corresponding software element identifier,
wherein the updated software element comprises a replacement class to replace a first class, and wherein updating the mapping information for the updated software element to be included in the software comprises:
remapping an identifier of the first class to the replacement class.

18. A method of updating software on a device, the device having mapping information comprising a mapping between software elements of the software in storage and corresponding software element identifiers referred to in code, the method comprising:
obtaining at least one updated software element;
storing the at least one updated software element;
updating the mapping information to include a mapping between the updated software element and a corresponding software element identifier,
wherein the updated software element comprises a replacement category for a first category, the replacement category comprising one or more methods or functions, wherein updating the mapping information for the updated software element to be included in the software comprises:
updating the mapping information for the updated category to point to a location of the replacement category.

* * * * *